May 4, 1965 W. F. BARTLETT ETAL 3,182,306
CONVERTER
Filed Oct. 4, 1962
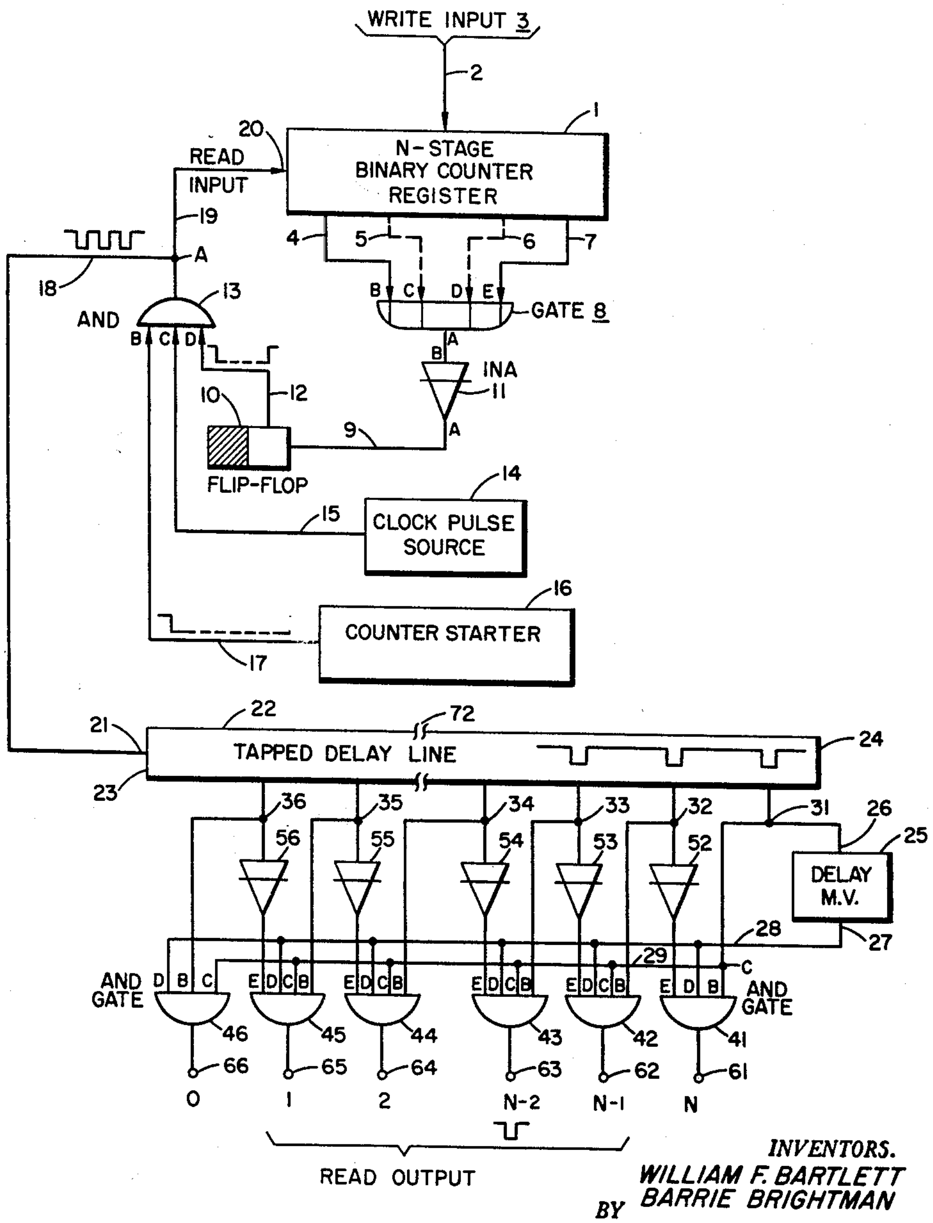
INVENTORS.
WILLIAM F. BARTLETT
BARRIE BRIGHTMAN
BY Samuel R. Genca
AGENT

United States Patent Office 3,182,306

Patented May 4, 1965

3,182,306

CONVERTER

William F. Bartlett, Rochester, and Barrie Brightman, Webster, N.Y., assignors to General Dynamics Corporation, Rochester, N.Y., a corporation of Delaware Filed Oct. 4, 1962, Ser. No. 228,305

2 Claims. (Cl. 340—347)

The present invention relates to a data processing system and, more particularly, to a binary-to-decimal converter.

In the past, binary-to-decimal conversion was accomplished by a system comprising a binary counter register and a complexity of interconnected logic gates and circuits terminating at a plurality of output leads, each one of which represented a decimal digital output. The logic gates and circuits in such systems are interconnected by a complex wire field into successive levels and the number of levels is a function of the counting capacity of the binary counter register or the order of conversion required; the higher order binary numbers requiring, of course, more levels of logic gates and circuits than the lower levels to convert a binary number to a decimal number.

In such systems of the prior art, distributed capacitance between wires of the complex wiring field is a major problem. This problem is particularly acute at high operating frequencies. The capacitive reactance beween wires delays information and distorts the information carrying pulses causing a malfunction in the system.

Accordingly, it is the general object of the present invention to provide a novel and improved converter.

It is the principal object of the present invention to provide a novel binary-to-decimal converter.

It is still another object of the present invention to reduce the complex wiring field of a binary-to-decimal converter.

It is a further object of this invention to provide a new and improved binary converter which is relatively simple and inexpensive to manufacture.

Briefly, the present invention accomplishes the above cited objects by providing a binary-to-decimal converter which includes means for converting a complement of a number stored in a binary counter register into a time base, such as a train of clock pulses, and transmitting the train of clock pulses over a single lead to a means for measuring the train of clock pulses against a known reference, such as a tapped delay line. The delay line has $n$ number of spaced taps disposed between a proximal and distal end of the delay line. The $n$ number of spaced taps is equal to the counting capacity of the binary counter register. The $n$th tap is disposed at the distal end of the delay line and represents the highest count of the binary counter register and the remaining taps represent successive descending decimal values. The spacing between taps in the delay line is substantially equal to the spacing between delayed clock pulses in the delay line. The converter further includes an AND gate for each tap and a delay multivibrator connected to the $n$th tap and to all the AND gates for opening all the AND gates in response to the leading pulse of the train of clock pulses reaching the $n$th tap, whereby the pulses in the train of clock pulses are aligned with corresponding taps in the delay line. The converter further includes means for closing all the AND gates except the AND gate which passes the last pulse of the train of clock pulses which represents the decimal count sampled in the binary counter register. The converter is reset by the delay multivibrator which has a delay time equal to the total delay of the delay line.

Further objects and advantages will become apparent as the following description proceeds, and features of novelty which characterize the invention will be pointed out with particularity in the claims annexed to and forming a part of this specification.

For a better understanding of the invention, reference may be had to the drawing which shows a binary-to-decimal converter in accordance with the invention.

In the binary code system, discrete characters, that is, letters of the alphabet or decimal digits, may be expressed by a group of information bits of two different polarities generally termed "mark" and "space" bits, wherein the presence of either polarity bit selected to be significant at any position within the group may be evidenced by the presence of a signal in that position, while the presence of the other polarity bit at any position within the group may be evidenced by the absence of a signal in that position. For purposes of describing the present invention and without intending or inferring that it be limited thereto, the "mark" information bit will be selected to be significant and will be evidenced by the presence of an electrical negative signal pulse denoted as a "1" state, while the "space" information bit will be evidenced by a ground potential or the absence of a signal denoted as a "0" state.

A common application for the converter of this invention is for converting binary information stored in a binary counter register to decimal information, which information will appear as a "mark" on one, and only one, of a plurality of terminals representing a decimal numerical order.

For purposes of illustration only, therefore, and without intending or inferring that it be limited thereto, the following description of the present invention will be on the basis of converting binary information stored in an $n$ stage binary counter register into its decimal counterpart and placing a "mark" on one, and only one, of a plurality of numerically arranged leads. The counting capacity of the binary counter register is $n$, any number.

Although any suitable binary counter may be employed without departing from the spirit of this invention, a conventional $n$-stage binary counter register, the details of which are well known in the art and form no part of this invention, will be assumed to be the binary counter register and is illustrated in block form in the drawing and has reference numeral 1. The $n$ stage binary counter register is provided with a write input lead 2 connected at 3 to any suitable source of binary signals, such as, for example, a conventional tape reader, not shown. To produce the different combinations of a plurality of electrical signals for each binary code repetition required for the operation of the converter of the present invention, the binary counter register may include in each stage a bistable multivibrator, such as a flip-flop, not shown, however, the details of which are well known in the art and form no part of this invention. Each of the bistable multivibrators is of the type which has two stable conditions of operation, either of which may be produced through the application of a signal to one input thereof, while the other may be produced by the application of a signal to the other input thereof. One side of the bistable multivibrator is considered to be the significant side. Each of the significant sides of the bistable multivibrator is connected with a lead wire 4, 5, 6–7, respectively, to a gate GJD8 at terminals B, C, D–E, respectively. Although only four leads 4, 5, 6–7 are shown representing a four-bit code, it should be understood that more leads and counting stages may be included in the binary counter register 1.

Gate GJD8 is the type which may be used as either and AND gate, for positive signal, or an OR gate, for negative signal. That is, output terminals A of gate GJD8 will be at ground potential only when all of the input terminals B, C, D–E are returned to a ground potential or a "0" state and will drop to a negative potential or a "1" condition when any one or more of the input terminals B, C, D–E are returned to a negative potential or "1" condition.

The other side of gate GJD8 is connected to a flip-flop 10 through an inverter amplifier INA11. Inverter amplifier INA11 is of the type which may be used as an AND gate or as a gated amplifier. A terminal C, not shown, is permanently returned to ground potential and is therefore eliminated from the logic symbol. Inverter amplifier INA11 is of the type in which a negative signal or a "1" state must be applied to the base input terminal B for the inverter amplifier INA11 to be biased for conduction in order to place a ground potential or a "0" state on output terminal A.

Flip-flop 10 may be any one of the well known types in which a ground potential or "0" state on conductor 9 will cause flip-flop 10 to be conductive, thereby placing a negative potential or "1" state on lead 12. Lead 12 is normally maintained at negative potential as long as binary counter register 1 contains a binary count. The lead 12 is at ground potential when the binary counter register 1 is cleared; that is, when the significant side of all the bistable multivibrators in the binary counter register 1 are set at a "0" state.

The logic symbols for gate GJD8, inverter amplifier INA11, and flip-flop 10 are well known and may be seen in U.S. Letters Patent No. 2,979,570, issued to Barrie Brightman on April 11, 1961, and assigned to the same assignee as the present invention.

The other side of lead 12 is connected to AND gate 13 at terminal D thereon. AND gate 13 includes terminals B, C and D and is enabled or opened by the simultaneous application of negative potentials or "1" state on terminals B, C, D. Terminal C of AND gate 13 is connected to a clock pulse source 14 by a lead 15. The clock pulse source 14 supplies negative clock pulses continuously to AND gate 13. A train of clock pulses is shown above lead 15. Although only three negative clock pulses are shown, it should be understood that the clock pulses are continuous and that a train of clock pulses having a number of pulses equal to the complement of the binary counter register 1 is gated through AND gate 13 in a manner to be hereinafter described.

Terminal B of AND gate 13 is connected to a read starter which applies a negative potential or "1" state on terminal B to open AND gate 13 in conjunction with the negative potential on terminals C and D of AND gate 13.

Read starter 16 maintains a negative potential or "1" state for a predetermined time period on terminal B of AND gate 13. The predetermined time period is at least equal to the complement of the number contained in the binary counter register 1, that is, the number of clock pulses required to clear the binary counter for the highest possible count contained therein. The AND gate 13 is automatically closed by flip-flop 10 in response to the binary counter register 1 being cleared. The read starter 16 may be operated manually through a switch, not shown, or may be tied in with other utilization circuits, not shown, which may switch or turn on the read starter 16.

AND gate 13 includes an output terminal A for passing the train of clock pulses therethrough. The output terminal A of AND gate 13 is connected to parallel leads 18 and 19. Lead 19 connects to a read input terminal 20 of binary counter register 1. The other single lead 18 is connected to input terminal 21 of a tapped delay line 22 having spaced taps 31–36. The taps 31–36 are disposed between the proximal end 23 and the distal end 24 of the delay line 22. Taps 31–36 are equally spaced such that the distance between delayed clock pulses is equal to the spacing between taps so that the delayed clock pulses in the delay line 22 may be measured against a known reference. The delay line 22 is shown broken at 72 to show that the length of the delay line has a pulse capacity at least equal to the counting capacity of the binary counter register 1. Therefore, any six taps 31–36 are shown in the drawing.

A normally closed AND gate is provided for each of the taps 31–36 to prevent short circuiting of the train of clock pulses applied to the delay line 22. AND gates 41–46 are connected at terminal B thereon to taps 31–36, respectively. Tap 31 disposed at the distal end 24 of delay line 22 is also connected to each of the AND gates 42–46 at terminal C by bus 29 and to a delay multivibrator 25 at input terminal 26. The other side of the delay multivibrator 25 has an output terminal 27 which is connected to terminal D of each of AND gates 41–46 by bus 28.

The delay multivibrator 25 is of conventional design and is arranged to have a normal state or "0" state and an alternate state or "1" state produced upon the application of a clock pulse or trigger signal in which state it remains for a duration of time designed into the circuit, and upon the conclusion of which it returns to the normal state or "0" state. The clock pulse emanating from tap 31 serves as a trigger signal to produce the alternate state in the multivibrator 25, thereby producing a negative potential upon output terminal 27 thereof, partially enabling AND gates 31–36. The leading negative clock pulse of the train of clock pulses emanating from tap 31 also partially enables AND gates 41–46. AND gates 41–45 are negative gates and are opened by the simultaneous application of a negative clock pulse or "1" state on terminals B, C, D and E thereof. AND gate 46 is opened by the simultaneous application of a negative clock pulse or "1" state on terminals B, C and D. In accordance with the invention, AND gate 41 includes an output terminal 61 which represents the *n*th or highest decimal count contained in the binary counter register 1, while AND gate 46 includes an output terminal 66 which represents the lowest or least significant count contained in the binary counter register 1 and is shown as the number "0." AND gates 42–45 represent consecutively lower counts as shown by leads 62–65, respectively. A negative clock pulse or "mark" emanating from one of the output terminals 61–62 signifies the highest count contained in the binary counter register 1 at the time of readout, and to prevent a clock pulse from emanating from the other leads 61–62 inverter amplifiers 52–56 are connected at terminal E of AND gates 41–45, respectively.

Inverter amplifiers 52–56 are of conventional design and are shown by a conventional logic symbol. Inverter amplifiers 52–56 normally maintain terminal E of AND gates 41–45, respectively, at a negative potential. Inverter amplifiers 52–56 are of the type in which a negative clock pulse at the input terminal connected to taps 32–36, respectively, will return terminal E of AND gates 41–46, respectively, to ground potential inhibiting or closing AND gates 41–46, respectively. Inverter amplifier 52 is connected between tap 32 and terminal E of AND gate 41. Inverter amplifier 53 is connected between tap 33 and terminal E of AND gate 42, while inverter amplifier 54 is connected between tap 34 and terminal E of AND gate 43. Although five inverter amplifiers 52–56 are shown, it should be understood that the number of inverter amplifiers is determined by the counting capacity of the binary counter register 1. The inverter amplifiers are connected in parallel between terminal E of the AND gates and the taps of the delay line 22 in a manner to inhibit a preceding AND gate. For example, inverter amplifier 56 is connected between tap 36 and terminal E of AND gate 45. In a similar manner, inverter amplifier 55 is connected between tap 35 and terminal E of AND gate 44.

In the operation of the binary-to-decimal converter, let it be assumed that the binary counter register 1 contains a decimal number N–2, the complement of which is 3; that is, three clock pulses are required to clear the binary counter register 1. The readout of the binary-to-decimal converter is in a form of a digital signal manifested in one, and only one, of output terminals 61–66. The output terminals 61–66 are numerically arranged in decimal form.

The counter starter 16 is actuated to thereby place a negative potential on lead 17 for a given time period, as shown by the extended negative pulse over lead 17. The clock pulse source 14 and flip-flop 10 maintain AND gate 13 in a normally open condition as long as there is a count stored in the binary counter register 1. Since AND gate 13 is open, a train of clock pulses passes through the AND gate 13 and is applied in parallel to leads 18 and 19. The train of clock pulses on lead 19 enters the binary counter register at read input terminal 20. The train of clock pulses in the binary counter register clears the binary counter register 1 which, in turn, closes AND gate 8 and switches a flip-flop 10, closing AND gate 13 so that the train of clock pulses contains a number of pulses which is the complement of the count contained in the binary counter register 1. For this particular example, the number of clock pulses in the train of clock pulses is three. During the same time period that the train of clock pulses is being applied to the binary counter register 1, the train of clock pulses is also carried over the single lead 18 to input terminal 21 of the delay line 22. The train of clock pulses in the delay line 22 passes over taps 36–32 since AND gates 41–46 are normally held closed. The clock pulses in the delay line 22 are delayed in time so that the spacing between clock pulses is equal to the spacing between taps 31–36. When the leading clock pulse in the train of clock pulses reaches tap 31, a negative potential is placed on terminal C of AND gates 41–46 by way of bus 29. At the same instant of time, delay multivibrator 25 is switched from its normal state to the alternate state, placing a negative potential on terminal D of AND gates 41–46 by way of bus 28. During this same instant of time, AND gates 41 and 42 remain in the closed condition since the second and third clock pulses in the train of clock pulses apply a negative potential on taps 32 and 33, respectively, causing inverter amplifier 52 to place a ground potential or inhibiting pulse on terminal E of AND gates 41 and 42, respectively. The third pulse is gated through AND gate 43 placing a "mark" or "1" state on terminal 63 which represents the decimal number N–2. Since only three clock pulses have been applied to the delay line 22, AND gates 44–46 remain in the normally closed condition due to the absence of a negative potential on terminal B thereon.

The delay multivibrator 25 remains in the alternate state for the duration of time designed into the circuit upon which it returns to the normal state closing all AND gates 41–46. The binary-to-decimal converter is now reset and ready to convert a binary count contained in the binary counter register 1 to a decimal count. The time duration designed into the delay multivibrator 25 is at least equal to the pulse time delay of the delay line 22. During this time duration, any energy, such as clock pulses, remaining in the delay line is dissipated by a resistance, not shown, in the delay line 22.

The operation of the binary-to-decimal converter for the readout of any binary number contained in the binary counter register 1 is the same as just described for the conversion of the assumed binary number N–2. It can be seen that the complement of the number stored in the binary register is transmitted over a single lead, such as lead 18, and measured against a known reference, such as delay line 22, thus eliminating the problem of distributed capacitance and inner capacitance between wires.

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. In combination, a periodic pulse source for producing a serial train of between one and N time spaced pulses, where N is a plural integer, a tapped delay line having an input and N spaced taps providing an output pulse at the tap thereof most distal from said input thereof a predetermined time interval after an input pulse is applied to the input thereof, the time delay provided by said delay line between each adjacent pair of taps being equal to the time spacing between successive pulses of said serial train, means coupling said source to the input of said delay line for applying said serial train of pulses as an input thereto, an individual AND gate corresponding to each of said N taps, first means coupling said most distal tap to a first input of each and every one of said AND gates to partially enable all of said AND gates only in response to the presence of an output pulse at said most distal tap, second means coupling said most distal tap to a second input of each and every one of said AND gates to disable all of said AND gates for a time interval greater than the total time interval occupied by a serial train of N of said time spaced pulses only in response to the termination of an output pulse at said most distal tap, individual third means coupling each of said taps other than said most distal tap to a third input of that AND gate with which that tap corresponds for partially enabling that AND gate only in response to the presence of an output pulse at that tap, individual fourth means coupling each of said taps other than said most distal tap to a fourth input of that AND gate corresponding to the next succeeding one of said taps to disable that AND gate only in response to the presence of an output pulse at that tap, and an individual output conductor connected to the output of each of said AND gates.

2. The combination defined in claim 1, wherein said periodic pulse source includes a clock pulse source for generating a continuous stream of said time spaced pulses, a binary counter register having a count capacity of N including a count manifesting zero, means for registering some count in said register, normally open switch means responsive to the closing thereof for applying each pulse from said clock pulse source both as an input to said tapped delay line and as an input to said register to advance the count thereof in response to each pulse, means for closing said switch means, and means coupled to said register for reopening said switch means in response to said register having a count register thereon manifesting zero.

References Cited by the Examiner

UNITED STATES PATENTS

| | | | |
|---|---|---|---|
| 2,810,518 | 10/57 | Dilton et al. | 340—347 |
| 2,830,758 | 4/58 | Gloess | 340—347 |
| 2,845,219 | 7/58 | Piel | 340—347 |

MALCOLM A. MORRISON, *Primary Examiner.*